Sept. 9, 1930.                J. A. ANGUS                1,775,381
        APPARATUS FOR MANUFACTURING BOTTLES AND LIKE ARTICLES OF GLASSWARE
                    Filed July 18, 1927      2 Sheets-Sheet 2
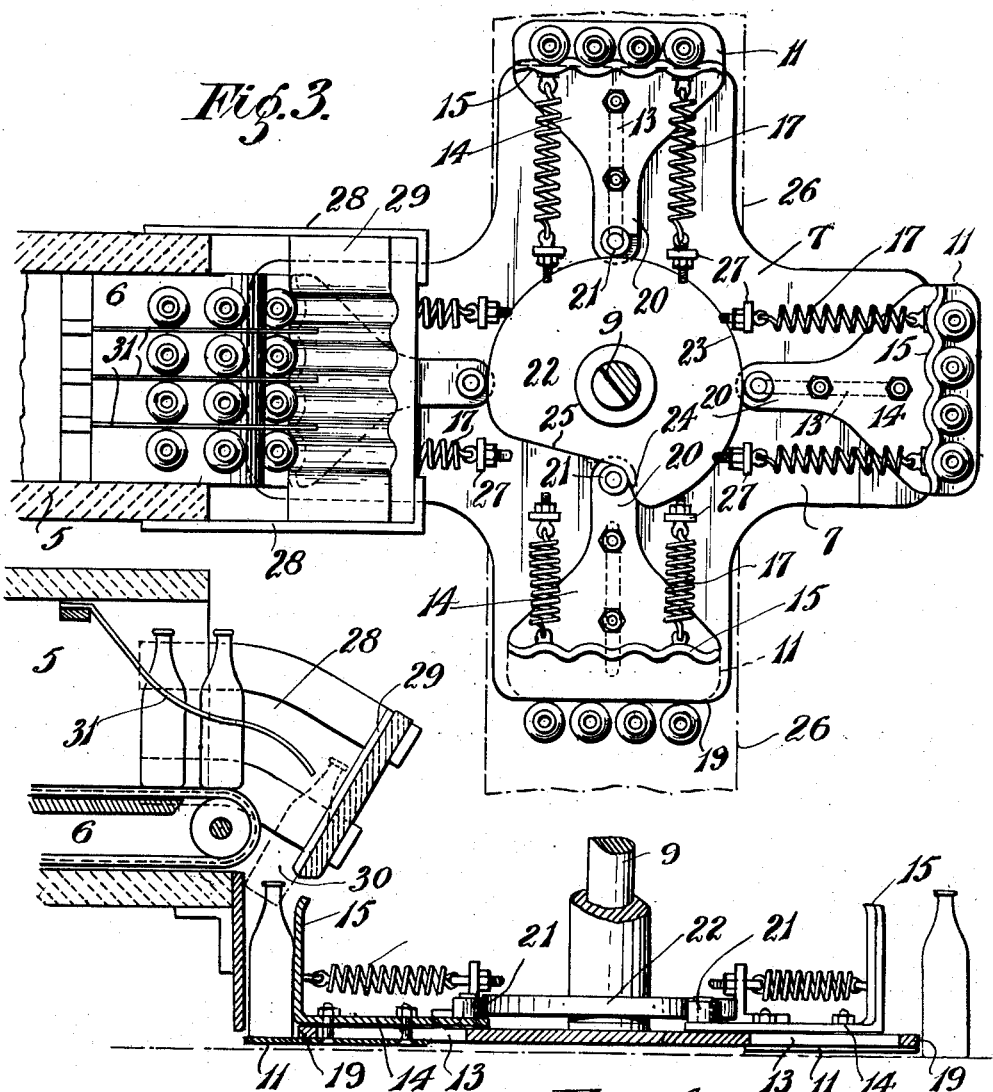
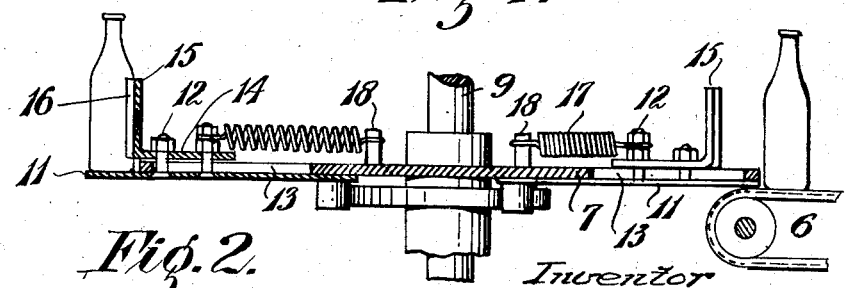
Inventor
J. A. Angus Patented Sept. 9, 1930

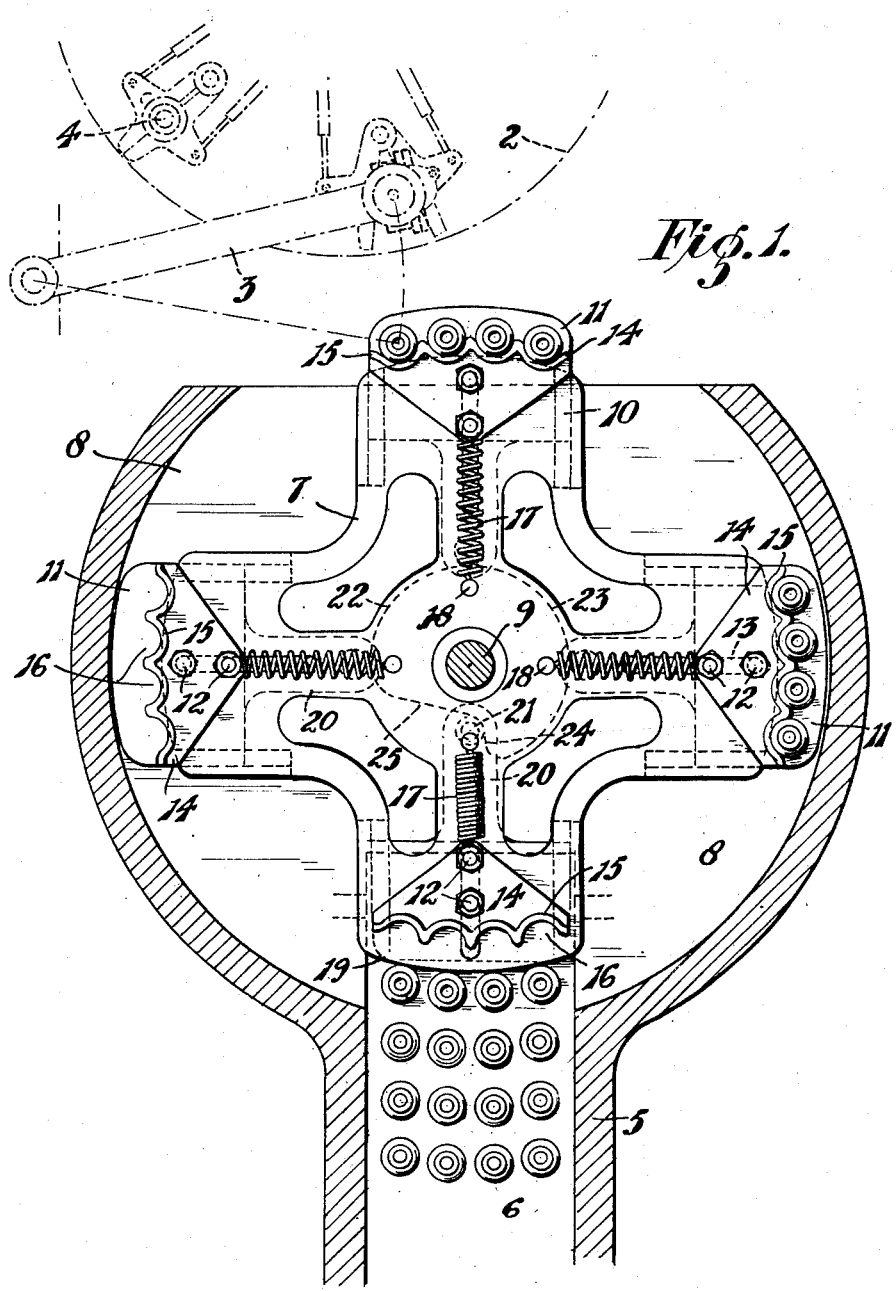

1,775,381

UNITED STATES PATENT OFFICE

JOSEPH ARMSTRONG ANGUS, OF CAULFIELD, VICTORIA, AUSTRALIA

APPARATUS FOR MANUFACTURING BOTTLES AND LIKE ARTICLES OF GLASSWARE

Application filed July 18, 1927. Serial No. 206,720.

This invention relates to apparatus for manufacturing bottles and other articles of glassware, and particularly to an improved mechanism for transferring the moulded bottles from the moulding machine to the annealing lehr, and for transferring the annealed bottles from the lehr to the discharge conveyors or devices.

The invention embodies a table or skeleton frame or like member which is adapted to be rotated in timed relation to the moulding machine and fitted with sliding plates or trays. These plates or trays are extended at one point in the rotation of the table or like member to receive the bottles from the moulding machine, and they are automatically retracted at a later point in the rotation of the said table to deposit the bottles onto the travelling conveyor of the annealing lehr.

Other important features are included in the invention and are hereinafter fully described aided by reference to the accompanying drawings wherein:—

Figure 1 is a plan view showing the improved mechanism arranged at the entrance end of the annealing lehr to receive the moulded bottles from the moulding machine and automatically deposit them onto the endless conveyor of the lehr.

Figure 2 is a longitudinal sectional view of Figure 1.

Figure 3 is a plan view showing the improved mechanism arranged at the discharge end of the annealing lehr to receive the annealed bottles and deliver them onto the discharge conveyor.

Figure 4 is a sectional view of the mechanism shown in Figure 3.

Referring initially to Figures 1 and 2 of the drawings, 2 indicates a bottle moulding machine which may be of known or approved type and 3 the device such as a pivoted arm used for automatically removing the bottles from the machine moulds 4. The improved mechanism forming the subject of the present invention is shown positioned between the moulding machine 2 and the annealing lehr 5, and is adapted to receive the hot bottles from the moulding machine and automatically transfer them onto the usual conveyor 6 of the annealing lehr.

In the exemplary construction which is illustrated, the mechanism comprises a table or skeleton frame 7 constructed preferably of metal and housed within a chamber 8 provided at the entrance end of the annealing lehr 5. This table is rigidly secured to a vertical shaft 9 which is rotated intermittently in the manner hereinafter described through an interconnected Geneva gear or other approved gearing—not shown.

Provided on the undersurface of the table 7 are series of guides 10 wherein flat trays or plates 11 are slidably supported. In the drawings four of these trays 11 are shown, but it is to be understood that any desired number may be used.

The sliding trays 11 have upstanding bolts 12 which extend through slotways 13 formed in the table 7 and are rigidly connected to supports 14 slidably mounted on the upper surface of said table. Each of the supports 14 has a vertical flange 15 formed with semicircular recesses 16 to accommodate a desired number of bottles or other moulded articles of glassware.

The sliding trays 11 and the connected supports 14 are furnished with coiled springs 17 arranged on the upper surface of the table 7 and anchored to the bolts 12 of the trays and to pins 18 fitted on said table. These springs constantly exert inward pressure on the trays 11 and supports 14 and thus tend to maintain them in retracted position within the periphery of the table so that the marginal portions 19 of the said table are exposed. Means other than springs may be employed to hold the trays 11 and supports 14 in retracted position.

Each of the sliding trays 11 has an inwardly extending arm 20 fitted with a roller or like anti-friction device 21 engaging a stationary cam 22 having three operative surfaces 23, 24 and 25. The first surface 23 is even and extends around approximately three-quarters of the cam periphery to maintain the trays 11 in extended position during three-quarters of each revolution, and particularly whilst they are in register with the moulding machine 2. The second cam surface 24 is sharply inclined inwardly to cause the trays 11 to be quickly retracted at the point adjacent to the annealing lehr to thus deposit the bottles onto the conveyor 6. The third cam surface 25 is gradually inclined outwardly and its function is to move the sliding trays back to extended position in the quarter revolution after passing the annealing lehr 5.

In operation, the shaft 9 is rotated to move the first sliding tray of the table 7 into position in register with the moulding machine 2, and said tray and support 14 while in this position are maintained extended beyond the edge portion 19 of the table by the engagement of the roller 21 with the cam surface 23. The forward recess 16 of the vertical flange 15 is first positioned opposite the arm 3 and in the operation of said arm a moulded bottle from the machine 2 is deposited onto the sliding tray 11 at a position within said first recess. The table 7 is now rotated a short distance to bring the second of the recesses 16 into register with the pivoted arm 3 to receive a moulded bottle, and this intermittent partial rotation of the table is continued until each one of the recesses 16 of the sliding tray has received a bottle from the moulding machine 2. The table 7 is now quickly rotated by its gearing to such an extent as to move the loaded tray away from the moulding machine and bring the following empty tray into register with the arm 3 to receive bottles.

The intermittent movements of the table 7 to advance each of the recesses 16 into register with the arm 3 and to advance the successive trays to charging position are derived from mechanical gearing of suitable type (such as an interconnected Geneva gear), and the operations are so timed in relation to the moulding machine that the various movements are performed during the periods when the hinged arm 3 is stationed inwardly as is shown in Figure 1.

The trays 11 after leaving the charging point at the moulding machine pass through the chamber 8 and are rotated towards the entrance end of the annealing lehr 5. Up to the time when the trays reach the lehr they are maintained extended by the cam surface 23, but immediately said trays reach the lehr the roller 21 engages the inward release surface 24 of the stationary cam 22 and the coiled spring 17 immediately retracts the sliding tray and its attached support 14 to a position inwardly of the marginal portion 19 of the table. The bottles which were supported by the tray are thus left unsupported and are automatically deposited onto the conveyor 6 for conduction through the lehr for annealing treatment in usual manner.

After a retracted tray has passed the lehr conveyor 6 the roller 21 engages the cam surface 25 and causes the tray and its attached support 14 to be slidably moved outwardly beyond the marginal portion 19 of the table into extended position in readiness to receive further bottles from the moulding machine 2.

Figures 3 and 4 of the drawings illustrate mechanism in position at the discharge end of the annealing lehr to transfer the bottles from the lehr conveyor 6 to the usual discharge conveyor 26. In this arrangement two coiled springs 17 are used with each sliding tray 11 and these springs are connected to the vertical flange 15 of the support 14 and to brackets 27 secured on the upper surface of the table 7. The inwardly extending arms 20 are formed on the supports 14 instead of on the trays and the rollers 21 are carried by said arms and arranged to engage the stationary cam 22.

The discharge end of the lehr is fitted with a frame 28 which supports a corrugated pad 29 of rubber or other resilient material against which the bottles from the lehr conveyor 6 are caused to fall. This pad 29 is inclined as is shown in Figure 4 and is adapted to guide the bottles end first through the space 30 onto the extended trays 11 of the rotating table. Curved guide wires 31 are fitted within the discharge end of the lehr to maintain the bottles spaced apart and to safely guide them onto the pad 29 as they are discharged from the conveyor 6.

The bottles after being deposited on the sliding trays 11 are moved by the rotation of the frame 7 to the discharge conveyor 26 and are automatically deposited thereon by the retraction of the sliding trays in the manner previously described.

Various modifications both in construction and in design may be made within the ambit of the invention as is defined by the appended claiming clauses.

What I do claim is:—

1. Mechanism for automatically transferring moulded articles of glassware from one position to another, including a member mounted for rotation, trays slidably carried below the member, a bottle supporting means carried above the member and connected to and slidable with said member, means for normally actuating the trays to a relatively inward limit position relative to the member, and a single element cooperating with the trays and serving to hold the trays against their operating means and in a projected position with respect to the member, said element being formed to permit the tray in a particular position incident to the rotation of the member to be moved to an inward limit with respect to the member by the actuating means for such tray.

2. Mechanism for automatically transferring moulded articles of glassware from one position to another, including a member mounted for rotation, trays carried below and movable radially of the member, said trays having an outward or receiving position beyond the member and an inward or discharging position inwardly of the edge of the member, a bottle supporting means carried above the member and connected to and slidable with said member, means connecting the member and trays to normally induce movement of the trays to discharging position, and an element cooperating with the trays and serving to maintain said trays in a receiving position for the greater portion of the movement of the rotating member and to permit said trays to move successively to a discharge position as each of the trays reach a predetermined position in the rotation of the member.

3. Mechanism for automatically transferring moulded articles of glassware or the like from one position to another, including a member mounted for rotation, a plurality of independent trays slidably mounted below the member, each of the trays being capable of a receiving position beyond the edge of the member and a discharge position inwardly of such edge, a bottle supporting means carried above the member and connected to and slidable with said member, means for moving the trays from the receiving position to the discharge position, and means cooperating with all the trays and maintaining a plurality of such trays continually in receiving position during the rotation of the member.

4. Mechanism for automatically transferring moulded articles of glassware or the like from one position to another, including a member mounted for rotation, a plurality of independent trays rotatably connected to and slidably mounted below the member, each of the trays being capable of a receiving position beyond the edge of the member and a discharge position inwardly of such edge, a bottle supporting means carried above the member and connected to and slidable with said member, means for moving the trays from the receiving position to the discharge position, and means cooperating with all the trays and maintaining a plurality of such trays continually in receiving position during the rotation of the member, said means permitting each of the trays to move to a discharge position as such tray reaches a predetermined position incident to the rotation of the member.

5. Mechanism for automatically transferring moulded articles of glassware or the like from one position to another, including a member mounted for rotation, a plurality of independent trays rotatably connected to and slidably mounted below the member, each of the trays being capable of a receiving position beyond the edge of the member and a discharge position inwardly of such edge, a bottle supporting means carried above the member and connected to and slidable with said member, means for moving the trays from the receiving position to the discharge position, and a cam cooperating with all the trays and maintaining a plurality of such trays continually in receiving position during the rotation of the member.

6. Mechanism for automatically transferring moulded articles of glassware or the like from one position to another, including a rotating member, trays arranged beneath and supported for sliding radial movement with respect to the member, an article support connected to each tray and projecting above the member, each tray and its support having a receiving position beyond the edge of the member and a discharge position inwardly of the member, springs connecting each tray and its support with the member and normally tending to hold the tray and its support in discharge position with respect to the member, and means simultaneously cooperating with all trays to hold certain of the trays in receiving position against the influence of their springs while permitting another of said trays to move to a discharge position under the influence of its spring.

7. Mechanism for automatically transferring moulded articles of glassware or the like from one position to another, including a rotating member, trays arranged beneath and supported for sliding radial movement with respect to the member, an article support connected to each tray and projecting above the member, each tray and its support having a receiving position beyond the edge of the member and a discharge position inwardly of the member, springs connecting each tray and its support with the member and normally tending to hold the tray and its support in discharge position with respect to the member, and a cam simultaneously cooperating with all trays to hold certain of the trays in receiving position against the influence of their springs while permitting another of said trays to move to a discharge position under the influence of its spring.

8. Mechanism for automatically transferring moulded articles of glassware from the annealing lehr to the discharge conveyor, comprising an intermittently rotatable member, trays for receiving the moulded articles and mounted for radial movement with respect to the member, said trays having an article receiving position beyond the member and an article discharging position inwardly of the member, a bottle supporting means carried above the member and connected to and slidable with said member, springs connecting the trays and the member to normally compel movement of the trays to discharging position, and a cam cooperating with all trays and serving to hold a plurality of said trays in article receiving position against the influence of their springs, said cam being formed to permit each tray reaching a predetermined position in the rotation of said member to move to a discharge position under the influence of its springs.

In testimony whereof I affix my signature.

JOSEPH A. ANGUS.